United States Patent [19]
Li

[11] Patent Number: 5,446,886
[45] Date of Patent: Aug. 29, 1995

[54] SYSTEM FROM OPTIMIZING QUERY PROCESSING OF MULTI-ATTRIBUTE DISTRIBUTED RELATIONS USING LOCAL RELATION TUPLE NUMBERS TO CHOOSE SEMIJOINS

[75] Inventor: Hong Li, Tokyo, Japan

[73] Assignee: Ricoh Company, Ltd., Tokyo, Japan

[21] Appl. No.: 31,207

[22] Filed: Mar. 12, 1993

[30] Foreign Application Priority Data

Mar. 12, 1992 [JP] Japan ................. 4-088208

[51] Int. Cl.⁶ ......................... G06F 17/30
[52] U.S. Cl. .................. 395/600; 364/DIG. 1; 364/283.4; 364/282.4; 364/282.1
[58] Field of Search .......................... 395/600

[56] References Cited

U.S. PATENT DOCUMENTS

| | | | |
|---|---|---|---|
| 4,769,772 | 9/1988 | Dwyer | 395/600 |
| 4,811,207 | 3/1989 | Hikita et al. | 395/600 |
| 5,121,494 | 6/1992 | Dias et al. | 395/600 |
| 5,241,648 | 8/1993 | Cheng et al. | 395/600 |
| 5,325,525 | 6/1994 | Shan et al. | 395/650 |

OTHER PUBLICATIONS

H. Li and H. Sato, "Optimization of Tree Query in Distributed Database System", IPSJ Database System SIG Report 64-6, IPSJ Programming Language SIG Report 26-3, Sep., 1990.

H. Li and H. Sato, "Discussion on Optimization of Distributed Query Processing", IPSJ Database System SIG Report 64-6, Mar., 1988.

*Primary Examiner*—Thomas G. Black
*Assistant Examiner*—Wayne Amsbury
*Attorney, Agent, or Firm*—Popham, Haik, Schnobrich & Kaufman, Ltd.

[57] ABSTRACT

A distributed database system includes a communication network having a plurality of nodes each with a distributed database, a local process part for extracting relations from each database by performing local processes at each node when a query including multi-attribute relations thereof is input, a degree setting part for setting a degree number of each of the extracted relations, a relation set part for arranging relation sets each containing relations having the same degree number by grouping the extracted relations according to the degree number, an extraction part for extracting single-attribute relations from each relation set so that the single-attribute relations are added to a first relation set having the lowest degree number, a semijoin operating part for repeatedly semijoining two relations of a only relation set only when the quantity of transfer data resulting from the semijoining is decreased, so that a derived relation is added to a next relation set, and a control part for allowing the semijoin operating part to sequentially perform the semijoining and adding so that each derived relation is added to the transfer data.

10 Claims, 5 Drawing Sheets

FIG. 1A
PRIOR ART

RELATION A

| a | b |
|---|---|
| $a_1$ | $b_1$ |
| $a_2$ | $b_2$ |

FIG. 1B
PRIOR ART

RELATION B

| a | b |
|---|---|
| $a_1$ | $b_2$ |
| $a_1$ | $b_3$ |

JOIN
A (a,b) → B

| a | b |
|---|---|
| $a_1$ | $b_1$ |
| $a_1$ | $b_2$ |
| $a_1$ | $b_3$ |
| $a_2$ | $b_2$ |

FIG. 1C
PRIOR ART

SEMIJOIN
A (a) → B

| a | b |
|---|---|
| $a_1$ | $b_2$ |
| $a_1$ | $b_3$ |

FIG. 1D
PRIOR ART

SEMIJOIN
A (b) → B

| a | b |
|---|---|
| $a_1$ | $b_2$ |

| R(a,b,c) | T | R(a) | R(b) | R(c) |
|---|---|---|---|---|
| tuple | 100 | 80 | 100 | 60 |

FIG.5B

| R(a,b,c) | T | R(a) | R(b) | R(c) |
|---|---|---|---|---|
| tuple | 5000 | 80 | 100 | 60 |

FIG.5C

| RELATION | T | a | b | c | DEGREE | LEVEL |
|---|---|---|---|---|---|---|
| $R_1(a,b)$ | 80(0.008) | 40(0.4) | 80(0.8) | — | 1 | LOW |
| $R_2(a,b,c)$ | 3000(0.003) | 50(0.5) | 40(0.4) | 80(0.8) | 2 | HIGH |
| $R_3(a,b,c)$ | 75000(0.075) | 30(0.3) | 50(0.5) | 50(0.5) | 3 | HIGH |

Da=Db=Dc=100. LENGTH OF EACH ATTRIBUTE : 1
VALUE IN PARENTHESES : SELECTIVITY $$COST = |R_3(a)| + |R_1| \times p_{3a} + |R_2| \times p_{1R'} + |R_3| \times p_{2R'} + 4C_0$$
$$= 30 + 80 \times 2 \times 0.3 + 3000 \times 3 \times 24/10000 + 75000 \times 3 \times 7/1000000 + 5 \times 4 \approx 121$$

FIG.5D

| RELATION | T | a | b | c | DEGREE | LEVEL |
|---|---|---|---|---|---|---|
| $R_1(b)$ | 95(0.95) | — | 95(0.95) | — | 1 | LOW |
| $R_2(a,b)$ | 70(0.007) | 70(0.7) | 60(0.6) | — | 1 | LOW |
| $R_3(a,b)$ | 2000(0.2) | 40(0.4) | 50(0.5) | — | 2 | HIGH |
| $R_4(a,b,c)$ | 4800(0.0048) | 30(0.3) | 60(0.6) | 80(0.8) | 2 | HIGH |

Da=Db=Dc=100. LENGTH OF EACH ATTRIBUTE : 1
VALUE IN PARENTHESES : SELECTIVITY $$COST = |R_4(a)| + |R_2| \times p_{4a} + |R_2| \times p_2 \times p_{4a} + |R_4| \times p_2 \times p_3$$
$$+ |R_1| \times p'_{4b} + 6C_0 \approx 143$$

SYSTEM FROM OPTIMIZING QUERY PROCESSING OF MULTI-ATTRIBUTE DISTRIBUTED RELATIONS USING LOCAL RELATION TUPLE NUMBERS TO CHOOSE SEMIJOINS

BACKGROUND OF THE INVENTION

The present invention generally relates to a distributed database system, and more particularly to a distributed database system for optimizing a sequence of query processes when a query including relations joined together with respect to multiple attributes thereof is input.

With recent development of computer systems and network technology, it is highlighted that distributed database systems, rather than centralized database systems, would be useful to efficiently store, retrieve and manipulate information in the distributed databases. However, a distributed database system still has some unresolved problems. One such problem is that it is difficult to efficiently perform the query processes for the distributed databases in response to an input query. Thus, the data transfer cost of the distributed database system is relatively high.

A paper entitled "Optimization of Tree Distributed Query" by H. Li and H. Sato (IPSJ Database System SIG Report 64-6; IPSJ Programming Language SIG Report 26-3, September 1990) discloses the use of semijoins between relations in order to reduce the quantity of data of relations and to decrease the total transmission time incurred when the tree distributed query processes are performed associated with the databases.

A paper entitled "Discussion on Optimization of Distributed Query Processing" by H. Li and H. Sato (IPSJ Database System SIG Report 64-6, March 1988) discloses a proposed approach for optimizing the transmission time and the response time in the distributed query processes associated with the databases. In the above mentioned paper, the uses of joins between multi-attribute relations and of semijoins between multi-attribute relations are discussed.

However, in the existing distributed database system, it is impossible to efficiently perform a sequence of query processes associated with distributed databases if a query including multi-attribute relations joined together with respect to the multiple attributes thereof is input. A query is a request for extracting information from the databases.

Next, a description will be given of the method for generating the semijoin between two relations. A derived relation resulting from the semijoin generation by this method is called a reducer, and this reducer serves to reduce the size of data to be transmitted. A query process of a distributed database system is performed in three major procedures. In a first procedure, local processes including projection operations, selection operations and joining operations are performed. In a second procedure, the size of data of relations to be transmitted is reduced. In a third procedure, the required operations are performed, and the data is transmitted to a node of the communication network from which a query was issued. When the second procedure is performed, the size of data to be transmitted is decreased by generating semijoins between single-attribute relations only.

FIGS. 1A–1E show a regular join between two relations and two semijoins between the relations derived from two distributed databases. The join between two relations A and B in FIGS. 1A and 1B is generated with respect to the attribute "a" as shown in FIG. 1C, and the resulting data includes all items of data of the two relations. A first semijoin between the two relations is generated with respect to the attribute "a" of the relation A as shown in FIG. 1D. The item "a1" of the attribute "a" is shared by the two relations A and B. From this first semijoin, a tuple including the items "a2" and "b2" in the relation A is reduced. A second semijoin between the two relations A and B is generated with respect to the attribute "b" as shown in FIG. 1E. The item "b2" of the attribute "b" is shared by the two relations. From the second semijoin, a tuple including the items "a1" and "b3" in the relation B is reduced. Generally, the quantity of data resulting from the semijoin generation is smaller than the quantity of data resulting from the regular join generation, as shown in FIGS. 1C–1E.

SUMMARY OF THE INVENTION

Accordingly, it is a general object of the present invention to provide an improved distributed database system in which the above described problems are eliminated.

Another, more specific object of the present invention is to provide a distributed database system which uses an optimized sequence of query processes for distributed databases when a query including relations joined together with respect to multiple attributes thereof is input such that the required data transfer cost is minimized. The above-mentioned objects of the present invention are achieved by a distributed database system for a communication network having a plurality of nodes each having a distributed database, which system includes a local process part for extracting relations from each database of the communication network by performing local processes at each of the nodes of the communication network when a query including multi-attribute relations is input from one of the nodes, a detection part for detecting a degree number for each of the extracted relations of the local process part, a relation set part for arranging a plurality of relation sets each of which contains relations having the same degree number in ascending order by grouping the extracted relations of the local process part according to the degree number detected by the detection part, the relation sets including a first relation set containing relations having the lowest degree number, an extraction part for extracting single-attribute relations from each of the relation sets of the relation set part so that the single-attribute relations are added to the first relation set, a semijoin operating part for repeatedly semijoining two relations of a relation set when a quantity of transfer data after the semijoining is detected to be smaller than a quantity of transfer data before the semijoining, and for adding derived relations resulting from the semijoining to a following relation set among the plurality of relation sets arranged by the relation set part for allowing the semijoin operating part to sequentially perform the semijoining and the adding for all of the plurality of relation sets arranged by the relation set part, starting from the first relation set and ending at a relation set having the highest degree number, so that each derived relation resulting from the semijoining is added to the transfer data.

According to the present invention, it is possible to efficiently perform the query processes for the distributed databases when a query including multi-attribute relations is input. The efficiency of the distributed database system is highly increased from that of the existing distributed database system due to the use of the degree number for each relation. It is possible to remarkably reduce the data transfer cost for the query processes.

Other objects and further features of the present invention will become more apparent from the following detailed description when read in conjunction with the accompanying drawings.

BRIEF DESCRIPTION OF THE DRAWINGS

FIGS. 1A, 1B, 1C, 1D, and 1E (which may be collectively referred to herein as "FIG. 1"), are diagrams showing a join between two relations and semijoins between the relations used in a distributed database system according to the prior art;

FIGS. 5A through 5D are diagrams showing the details of some distributed databases and the results of the associated equations according to the present invention.

DESCRIPTION OF THE PREFERRED EMBODIMENT

Figure 4A:
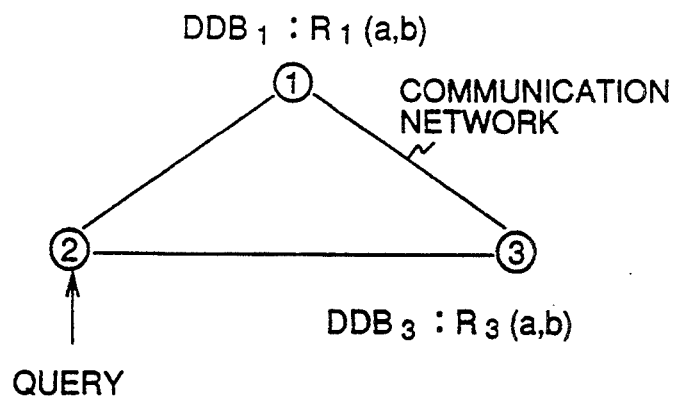
FIGS. 4A through 4D are diagrams for explaining query processes performed when a query is input from a node of a communication network.

A description will be given of query processes performed, on a communication network having a plurality of nodes each of which includes a distributed database, when a query is input. FIG. 4A shows a communication network having three nodes (1) through (3) each of which includes a distributed database. The node (1) has a distributed database DDB1 in which a relation R1(a,b) (where "a" and "b" are two attributes of the relation R1) is described, the node (2) has a distributed database DDB2, and the node (3) has a distributed database DDB3 in which a relation R3(a,b) is described.

In the communication network shown in FIG. 4A, a query, which is a request for extracting information from the distributed databases in the communication network, is input from the node (2). For example, if a query R(a,b)=R1(a,b),R3(a) (where "*" denotes a relational operator indicating a join between relations) is provided, three query processes shown in FIGS. 4B through 4D are possible.

Figure 4B:
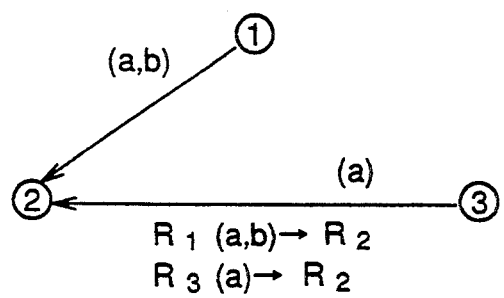
Figure 4C:
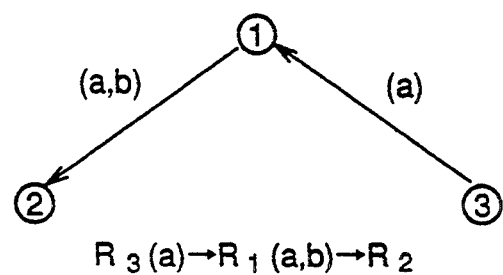
Figure 4D:
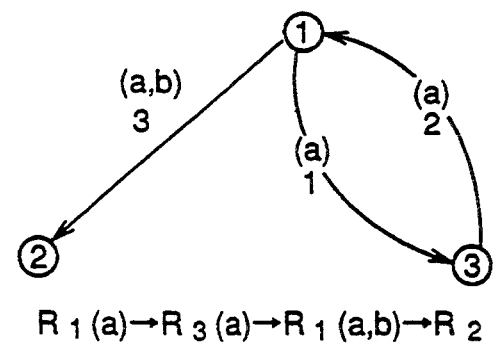

In the first query process shown in FIG. 4B, data of the relation R1(a,b) is transmitted from the node (1) to the node (2), and data of the relation R3(a) is transmitted from the node (3) to the node (2). In the second query process shown in FIG. 4C, data of the relation R3(a) is transmitted from the node (3) to the node (1) so that a semijoin is generated, and data of the relation R1(a,b) is transmitted from the node (1) to the node (2). In the third query process shown in FIG. 4D, data of the relation R1(a) is transmitted from the node (1) to the node (3) after a semijoin was generated, and data of the relation R3(a) is transmitted from the node (3) to the node (1) after a semijoin was generated, and data of the relation R1(a,b) is transmitted from the node (1) to the node (2).

The distributed database system according to the present invention uses an optimized sequence of query processes for the distributed databases so as to minimize the required data transfer cost.

Next, a description will be given of a distributed database system in which the sequence of query processes for the distributed databases is optimized.

In the distributed database system according to the present invention, it is assumed that the query processes associated with the distributed databases are performed on a computerized communication network having a plurality of nodes each of which includes a distributed database at a local site. Thus, the cost required for performing the query processes is only that of the data transfer cost in the communication network. This data transfer cost C is expressed by the following equation:

$$C = C_0 + a X \qquad (1)$$

where "Co" is the start-up cost, "a" is the cost needed to transmit one unit of data on the communication networks and "X" is the quantity of data being transmitted. For the sake of convenience, the unit data transfer cost "a" is assumed to be equal to 1.

It is assumed that each node of the communication network includes a distributed relational database at a local site, and that a query is input from one node of the communication network. The query processes associated with the distributed databases are performed between two or more nodes of the communication network. It is assumed that the relations are dispersed at the network sites. If there are two or more relations having the same items in a database, only one of the relations is previously chosen. It is assumed that data is uniformly distributed on each relation, and that attributes are statistically independent from each other. The above mentioned assumptions are normally used in a distributed database system. The distributed database system according to the present invention uses an optimized sequence of query processes for the databases when a query including relations joined together with respect to multiple (two or more) attributes thereof is input.

Next, the schema used in the distributed database system of the present invention will be described. As described above, the distributed database system of the present invention uses an optimized sequence of query processes for distributed databases when a query including relations joined together with respect to multiple attributes thereof is input.

Hereinafter, "R" (or "U") denotes a relation or its tuple, and "a" "b" "c", ..., denote attributes of a relation. "R (a, b, c)" denotes a relation having attributes "a" "b" and "c" "R(a)" denotes a relation having an attribute "a". "t" (or "T") denotes a tuple number of a relation, and "ta" denotes a tuple number of a relation R(a). "Da" denotes the size of the range of an attribute "a". "pa" denotes the selectivity of a relation R(a), which is indicated by the formula: pa=ta/Da.

The following notations are also used in the distributed database system according to the present invention. "R(a)" indicates a relation or a tuple of the relation. "|R|" indicates the size of a relation R. "tab" indicates the tuple number of a relation R(a,b) having the attributes "a" and "b". A notation "R1→R2" indicates that data of a relation R1 is transmitted to a relation R2, and a semijoin bwtween the relations is generated at a site of the relation R2.

Next, the selectivities of multi-attribute relations and the semijoins between multi-attribute relations will be described. Conventionally, in order to determine the selectivity of a relation R(a,b), the selectivity pa (=ta/Da) of a single-attribute relation R(a) and the selectivity pb (=tb/Db) of a single-attribute relation R(b) are used. Generally, with respect to the tuple number "ta" the tuple number "tb" and the tuple number "tab" of the relation R(a,b), the following inequality is satisfied.

$$tab \leq ta \times tb \qquad (2)$$

The following formula is derived from the inequality (2) above.

$$tab/(Da \times Db) \leq pa \times pb (=(ta \times tb)/(Da \times Db)) \qquad (3)$$

Therefore, the selectivity "pab" of the relation R(a,b) is obtained as follows.

$$pab = tab/(Da \times Db) \qquad (4)$$

Accordingly, the selectivity "p" of a multi-attribute relation R(a1,a2, ... ,an) having a tuple number t is indaited as follows.

$$p = t/(Da1 \times Da2 \times ... \times Dan) \qquad (5)$$

When a semijoin between multi-attribute relations is generated by making use of the selectivities of the multi-attribute relations, such a semijoin can be generated in accordance with the associative law which is the same as that for a single-attribute relation. Hence, a tuple number t' after generation of the semijoin between the multi-attribute relation having the selectivity "p" and a relation "R" having a tuple number "t" becomes as follows.

$$t' = t \times p \qquad (6)$$

The expected value R'(b) of the tuple number with respect to the non-joined attribute "b" is $$R'(b) = min [t \times p, tb]. \qquad (7)$$

This formula (7) is an approximation of the formula (6). As described above, the following inequality is generally satisfied.

$$tab << ta \times tb \qquad (8)$$

Thus, the following inequality is satisfied.

$$pab << pa \times pb \qquad (9)$$

It is apparent from the inequality (9) that the selectivity when a semijoin between multi-attribute relations with respect to the attributes "a" and "b" is generated is smaller than or equal to the sum of the selectivity when a semijoin with respect to the attribute "a" is generated and the selectivity when a semijoin with respect to the attribute "b" is generated.

Accordingly, it is possible to effectively reduce the quantity of data to be transmitted by generating a semijoin between multi-attribute relations with respect to multiple attributes thereof. However, some duplicate data of the same attribute may appear if a semijoin with respect to only one attribute is generated.

Next, the degree number of a multi-attribute relation used by the distributed database system according to the present invention will be described.

If each item of data of a relation in a database can be specified using data of one attribute of the relation only, the degree number of the relation is equal to 1. In a case in which a relation including employee records has one attribute of identification number, each employee of the employee records is specified with a known identification number only, and the degree number of the relation in this case is equal to 1. However, in another case, the identification number is unknown and it is necessary to use, for example, the employee name and the birth date in order to specify each employee of the records. In such a case, the degree number of the relation is equal to 2.

Generally, a multi-attribute relation R(a1,a2, ... ,an) has a tuple number T, and each of single-attribute relations R(ai) (i=1,2, ... ,n) has a tuple number ti. In the distributed database system according to the present invention, integers Ki (i=1,2, ... ,n) with respect to the relation R are defined as follows.

$$K1 = min[t1, t2, ..., tn]$$

$$K2 = min [t1 \times t2, t1 \times t3, ..., t_{n-1} \times t_n]$$

$$Kn = t1 \times t2 \times ... \times tn \qquad (10)$$

According to the definitions of the integers Ki, the following inequalities are satisfied.

$$K1 \leq K2 \leq ... Kn \qquad (11)$$

$$K1 \leq T \leq Kn \qquad (12)$$

If the following inequalities are satisfied:

$$K1 \leq K2 \leq ... \leq Km \leq T < Km+1 \leq ... \leq Kn \qquad (13)$$

the degree number d(R) of the relation R is defined to be equal to the number "m" that is "d(R)=m".

FIG. 5A shows a table in which associated data of a relation R(a,b,c) having the degree number equal to 1 is indicated. The tuple numbers of the single-attribute relations R(a), R(b), and R(c) are respectively; t1=80, t2=100, and t3=60. In accordance with the above equations (10), the values of the integers Ki (i=1,2,3) with respect to the relation R(a,b,c) are obtained as follows.

$$K1 = t3 = 60$$

$$K2 = t3 \times t1 = 60 \times 80 = 4800$$

$$K3 = t1 \times t2 \times t3 = 60 \times 80 \times 100 = 480000$$

Since the tuple number T of the relation R(a,b,c) is equal to 100, $$K1(=60) < T(=100) < K2(=4800).$$

Hence, it is possible to detect that the degree number of the relation in the table shown in FIG. 5A is equal to 1.

FIG. 5B shows a table in which associated data of a relation R(a,b,c) having the degree number equal to 2 is indicated. According to the table shown in FIG. 5B, the associated data is the same as that of the table shown in FIG. 5A, except that the tuple number of the relation R(a,b,c) is equal to 5000. Since the tuple number T of the relation R(a,b,c) is equal to 5000 as shown in the table of FIG. 5B, the following inequalities are satisfied:

$$K2\ (=4800) < T\ (=5000) < K3\ (=480000).$$

Thus, the degree number of the relation R(a,b,c) shown in FIG. 5B is equal to 2.

There are three important factors which must be evaluated when a first relation having multiple attributes at one node of a communication network is transmitted to another node so that the first relation is joined to a second relation. The first factor is the quantity of data to be transmitted from one node to another. The data transfer cost varies depending on the data quantity.

The second factor is whether or not the quantity of data of the second relation is reduced by generating a join between the relations. If the quantity of data of the second relation is reduced due to the semijoin, the semijoin between the relations is said to have a benefit. This factor is influenced by the above described selectivity of the relation data to be transmitted.

The third factor is the effect of associated data between the attributes of the transfer data. When a projection of the first relation is made on the second relation and then the resulting relation is transmitted, the quantity of duplicate data is reduced. Although the selectivity is increased each time a projection is made, the degree number of a relation R having "n" attributes is not greater than the degree number of a derived relation R' as the result of the projection. It is obvious that the value of the degree number of the relation R' lies between 1 and "n".

Assuming that "T" is the tuple number of the relation R and "T'" is the tuple number of the derived relation as the result of the projection, the inequality: $T' \leq T$ is satisfied. Assuming that "Ki" ($1 \leq i \leq n$) are integers used to calculate the degree number of the relation R, and that "Ki'" are integers used to calculate the degree number of the derived relation R', the inequality: $Ki' > Ki$ is satisfied. Especially, the degree number of a derived relation when it is derived from a relation with the degree number equal to 1 is also equal to 1.

Next, the degree number of the relation R when a semijoin is generated using the relation R will be described. Assume that the tuple number of a relation R(a1,a2, ... ,an) is denoted by "T" the selectivity of a relation R1(a1) is denoted by "p", the tuple number of a derived relation R' is denoted by "T'", the tuple number of the relation R for each attribute is denoted by "ti" ( i=1,2, ... , n) , and the tuple number of the derived relation R' for each attribute is denoted by "ti'". The following equation is satisfied.

$$T' = T \times p \quad (14)$$

The following inequality is derived from the above equation (14).

$$T' < K'm+1 \quad (15)$$

For the sake of convenience, the conditions: $t2 \leq t3 \leq ... tn$ are assumed. From the above equation (14), the following equation is obtained:

$$K'm + 1 = \min\ [t1 \times p \times \min[T', t2] \times \quad (16)$$

$$\min[T', t3] \times ... \times \min[T', tm + 1], \min[T', t2] \times$$

$$\min[T', t3] \times ... \times \min[T', tm + 2]]$$

If the tuple number T' appears in the result of calculation of the equation (16), the equation (15) is always satisfied. If the tuple number T' does not appear there, the equation (16) is equivalent to the following equation.

$$K'm+1 = \min[t1 \times p \times t2 \times ... \times tm+1,\ t2 \times t3 \times ... \times tm+2] \quad (17)$$

It is apparent from the equations (14), (16) and (17) that the equation (16) is satisfied.

Accordingly, two principles can be obtained. The first principle is that the degree number of a derived relation is not greater than the degree number of the input relation having "n" attributes when a semijoin between the relations is generated. In most cases, the degree number of the derived relation is less than that of the input relation when such a semijoin is generated. The second principle is that the degree number of a derived relation is not greater than the degree number of the input relation having "n" attributes when a semijoin is generated using a single-attribute relation from the input relation. The expected value of the tuple number for a non-joined attribute of a derived relation is calculated in accordance with the above equation (7). It is possible that the degree number of a derived relation after a semijoin is generated is equal to 1 if the selectivity p is suitably preset such that the inequality: $T' \leq t2$ is satisfied.

Generally, when the degree number of a relation is small, little duplicate data appears in a derived relation. When an input relation (any of the input relations included in the query) having "n" attributes has a degree number equal to "m" (m>1), much duplicate data may appear in a single-attribute relation derived from the input relation. Hereinafter, a relation having a degree number "m" greater than half of the attribute number "n" (m>n/2) is called a high-level relation, and a relation having a degree number "m" smaller than half of the attribute number "n" (m<n/2) is called a low-level relation. According to the present invention, the data transfer cost can be remarkably reduced by dividing a high-level relation having a number of attributes into low-level relations having fewer attrbibutes than the high-level relation.

Figure 2:
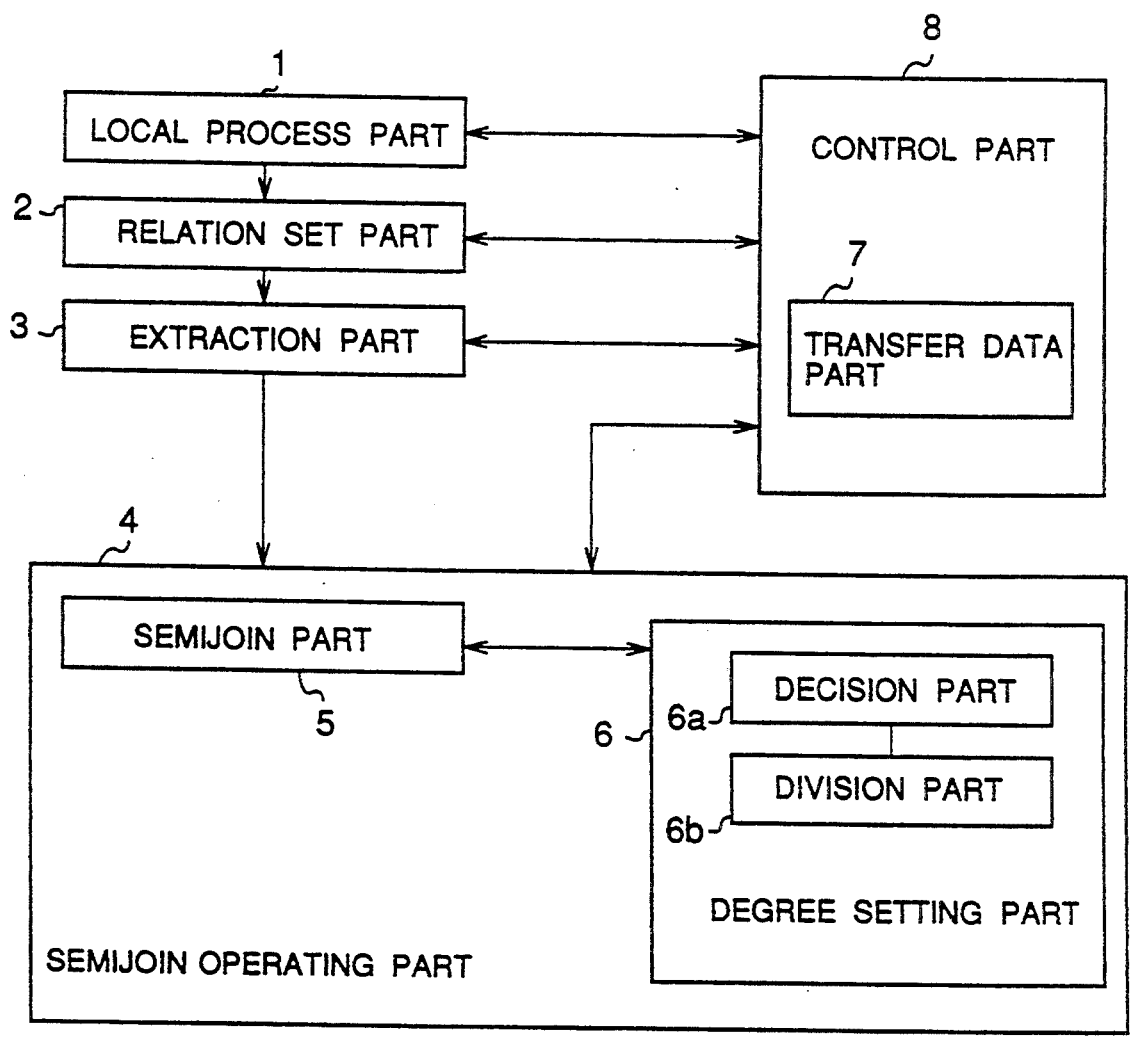
FIG. 2 is a block diagram showing an embodiment of a distributed database system according to the present invention.

FIG. 2 shows a preferred embodiment of the distributed database system according to the present invention. The distributed database system of the present invention is applied to a communication network having a plurality of nodes each including a distributed database, and the distributed database system uses an optimized sequence of transfer processes associated with distributed databases when a query including input relations joined together with respect to multiple attributes thereof is input.

The distributed database system shown in FIG. 2 includes a local process part 1, a relation set part 2, an extraction part 3, a semijoin operating part 4, and a control part 8. The semijoin operating part 4 includes a semijoin part 5 and a degree setting part 6. The control part 8 includes a transfer data part 7 in which the transfer data is generated as a result of the query processes is generated.

The local process part 1 extracts relations from each database of the communication network by performing local processes at each of the nodes of the communication network when a query including multi-attribute relations is input from one of the nodes. The degree setting part 6 sets a degree number of each of the extracted relations from the local process part 1 in accordance with the above-mentioned formulas (10) through (13).

The relation set part 2 arranges a plurality of relation sets each of which contains relations having the same degree number in ascending order by grouping the extracted relations of the local process part 1 according to the degree number detected by the degree setting part 6, the relation sets including a first relation set containing relations having the lowest degree number.

The degree setting part 6 includes a decision part 6a and a division part 6b. The decision part 6a detects whether or not a derived relation resulting from the joining by the semijoin operating part 4 is a high-level relation having a degree number greater than half of the number of attributes of any of the input relations. The division part 6b divides the above-mentioned derived relation into low-level relations each having a degree number smaller than half of the number of attributes of any of the input relations when the decision part 6a detects that the above-mentioned derived relation is a high-level relation.

The extraction part 3 extracts single-attribute relations from each of the relation sets of the relation set part 2 so that the single-attribute relations are added to the first relation set.

The semijoin operating part 4 repeatedly semijoins two relations of a relation set when a quantity of transfer data after the semijoining is detected to be smaller than a quantity of transfer data before the semijoining, and adds derived relations resulting from the semijoining to a following relation set among the plurality of relation sets arranged by the relation set part. The semijoin part 5 detects whether or not the quantity of data to be transmitted as a result of the semijoining of the two relations is less than the quantity of data to be transmitted before the semijoining is performed. The semijoining part 5 generates a semijoin between the two relations when it detects that a derived relation resulting from the semijoin has the benefit.

In addition, the semijoin operating part 4 semijoins two relations from among the low-level relations of the division part 6b in the above described manner.

The control part 8 allows the semijoin operating part 4 to sequentially perform the above mentioned semijoining and adding for all of the plurality of relation sets arranged by the relation set part 2, starting from the first relation set and ending at a relation set having the highest degree number, so that each derived relation resulting from the semijoining is added to the transfer data. The thus obtained transfer data is transmitted to the above-mentioned node.

Figure 3:
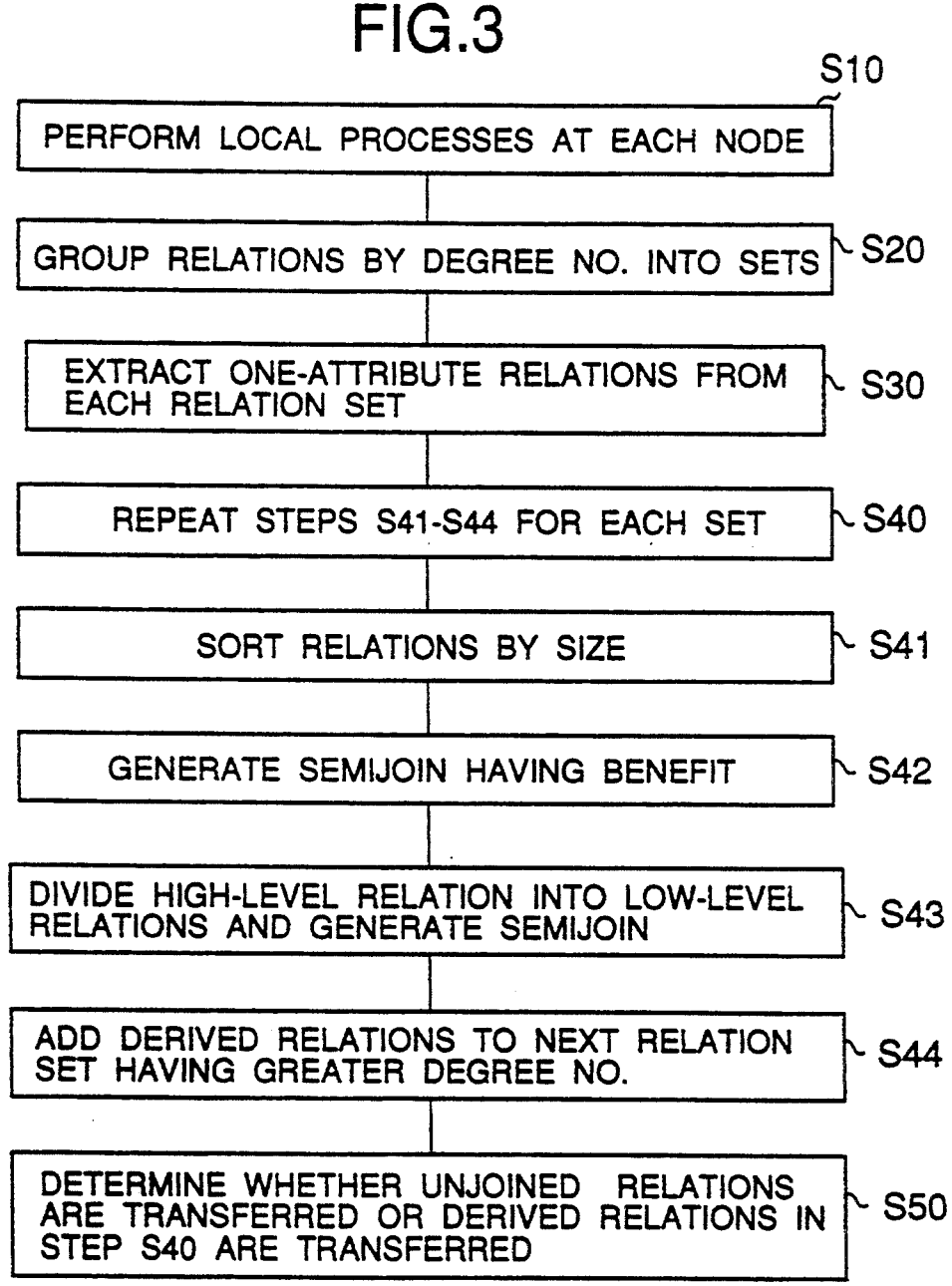
FIG. 3 is a flow chart for explaining an optimized sequence of query processes performed by the distributed database system shown in FIG. 2.

FIG. 3 shows a sequence of query processes used by the distributed database system of the present invention shown in FIG. 2. The sequence of the query processes is performed by the distributed database system such that the data transfer cost is minimized. When it is detected that a semijoin generated using a relation has a benefit as mentioned above, the relation is joined and a derived realtion resulting from the joining is transmitted. Generally, if the semijoin has the benefit, the cost incurred when the derived relation data is transmitted after the semijoin is generated is smaller than the cost incurred when the unjoined relation data is directly transmitted without generating any semijoin.

When a query including relations joined with respect to multiple attributes thereof is input to a communication network having a plurality of nodes, the sequence of query processes shown in FIG. 3 is performed by the distributed database system shown in FIG. 2. Step S10 performs local processes at each node of the communication network to extract relations from the distributed database. A degree number for each of the extracted relations is detected by the degree setting part 6 shown in FIG. 2. The local processes performed in step S10 include projection operations, selection operations, and joining operations for each relation of the query.

Step S20 groups the extracted relations in step S10 according to the degree number detected by the degree setting part 6, so that a number of relation sets each containing relations with the same degree number are arranged in ascending order. Generally, the relation sets "Gi" include one or more relations having the degree number "i" ($1 \leq i \leq n$). Especially, the relation set including relations with the lowest degree number is referred to as the first relation set G1. Usually, the degree number of the first relation set G1 is equal to 1, and the first relation set G1 includes single-attribute relations only.

Step S30 extracts single-attribute relations from each of the relation sets obtained in step S20 excluding the first relation set G1. The extracted single-attribute relations are added to the first relation set G1. Step S40 repeats the following steps S41 through S44 for each of the relation sets obtained in step S20. This step is sequentially performed from the first relation set G1 to the relation set having the highest degree number.

Step S41 sorts the relations of each relation set according to the size of each relation in ascending order. Step S42 generates a semijoin between two relations in each relation set when it is detected that the semijoin has a benefit. Each derived relation as a result of the semijoin is added to the transfer data (which becomes the response to the query) of the transfer data part 7 in step S42. This step is sequentially performed from the relation of the smallest size in the relation set to the relation of the greatest size in the relation set. Generally, when it is detected that a semijoin between a first relation and a second relation has no benefit, the first relation is eliminated. However, if the first relation has no attribute being shared by the second relation, the first relation is not eliminated.

When a derived relation in step S42 is detected as being a high-level relation, step S43 divides the high-level relation into low-level relations. In step S43, a semijoin between a low-level relation having the smallest size and a relation having the next smallest size is generated when it is detected that the semijoin has a benefit. This procedure is repeated until the relation of the greatest size of the relation set is processed.

Step S44 adds a derived relation resulting from the joining in the target relation set in step S42 to a next relation set which follows the target relation set in the ascending arrangement order. When two or more relations remain unprocessed in the target relation set as a result of the step S43 mentioned above, step S44 adds the remaining relations to a next relation set which follows the target relation set in the ascending arrangement order. In the case of the relation set having the highest degree number, the derived relations are added to the transfer data in step S44.

Step S50 decides whether unjoined relations are transmitted to the transfer data without generating any semijoin or the relations derived as a result of the above mentioned procedures in steps S41–S44 are transmitted to the transfer data after the corresponding semijoin is generated.

In order to reduce the response time needed in response to the query associated with the query processes, it is desirable that the single-attribute relations extracted from each relation set are added to each relation set in step S30, and that the procedures of steps S41–S44 are performed for the respective relation sets in parallel.

FIG. 5C shows the details of a distributed database for which a sequence of query processes is performed by the distributed database system shown in FIG. 2. The distributed database shown in FIG. 5C contains a low-level relation R1(a,b) with the degree number equal to 1, a high-level relation R2(a,b,c) with the degree number equal to 2, and a high-level relation R3(a,b,c) with the degree number equal to 3. The sequence of query processes performed according to the present invention when a query including the relations R1, R2 and R3 joined with respect to the attributes (a,b,c) is input will be described.

In the example shown in FIG. 5C, the start-up cost Co is equal to 5. After the local processes are performed in step S10, step S20 groups the relations according to the degree number so that three relation sets Gi=[R1], G2=[R2], and G3=[R3] are arranged.

Step S30 extracts single-attribute relations R2(a), R3(a) and R3(c) from each of the relations R2 and R3, and adds these relations to the relation set G1 having the lowest degree number. The resulting relation set Gi' at this time is indicated as follows.

G1' = [R3(a),R2(b),R3(c),R1]

According to the procedures of steps S41–S44, the following query process is selected.

R3 (a)→R1. Because a semijoin generated with the relation R2(b) has no benefit, the relation R2(b) is not added to the relation set G2. The relation R3(a) is joined to the relation R1, and the resulting relation R1'(a,b) and the relation R3(c) are added to the relation set G2. The tuple number of the relation R1' is equal to 24 (=80×0.3). The resulting relation set G2' is as follows.

G2' = [R1'(a,b),R3(c),R2]

According to the procedures of steps S41–S44, the relation R1' is transmitted to the relation R2 so that a semijoin between the two relations is generated. A derived relation resulting from the semijoin is added to the relation set G3. Because a semijoin generated using the relation R3(c) has no benefit, the relation R3(c) is not added to the relation set G3. Step S50 decides that the following sequence of query processes is to be selected.

R3(a)→R1→R2→R3→

The data transfer cost needed for the above mentioned sequence of query processes is calculated as shown in FIG. 5C.

FIG. 5D shows the details of another distributed database for which a sequence of query processes is performed. The distributed database shown in FIG. 5D includes a low-level relation R1(b) with the degree number equal to 1, a low-level relation R2(a,b) with the degree number equal to 1, a high-level relation R3(a,b) with the degree number equal to 2, and a high-level relation R4(a,b,c) with the degree number equal to 2. The sequence of query processes performed according to the present invention when a query including the relations R1, R2, R3 and R4 joined with respect to the attributes (a,b,c) is input will be described.

In this example, the start-up cost Co is equal to 5. After the steps S10–30 are performed, the resulting relation sets are:

G1' = [R4(a),R3(b),R4(c),R1,R2], G2 = [R3,R4]

According to the procedures of steps S41–S44 performed for the relation set G1', the following query process is selected:

R4(a)→R2.

The relation R4(a) is joined to the relation R2 so that the resulting relation R2'(a,b) is generated. The resulting relation R2'(a,b), the relation R4(c), and the relation R1 are added to the relation set G2. The relation R3(b) is not added to the relation set G2 because a semijoin generated using the relation R3(b) has no benefit. Thus, the relation set G2'=[R2'(a,b),R4(c),R1,R3,R4] is obtained.

According to the procedures of steps S41–S44, the following sequence of query processes is selected.

R2'(a,b)→R3(a,b)→R4(a,b,c)→

The resulting relation R4'(b) is transmitted to the relation R1 so that a semijoin between the two relations is generated. After the semijoin is generated, the resulting relation data is transmitted to the node from which the query is issued. The response to the query is generated at this node from the transfer data.

R'4(b)→R1→

Accordingly, the sequence of the query processes to be selected is

R4(a)→R2(a,b)→R3(a,b)→R4(a,b,c)→R'4(b)→R1→

The data transfer cost needed for the sequence of the query processes is calculated as shown in FIG. 5D.

Next, a description will be given of the selectivity of the multi-attribute relation when it is joined to another relation.

The selectivity when a semijoin between a relation R(a,b, . . .) and a relation R(a,b) is generated with respect to the two attributes (a,b) will be described. Assuming that a tuple number "tr" of the relation R(a,b) is selected, the selectivity "pr" of the relation R(a,b) at this time is indicated by the equation: $pr = tr/(Da \times Db)$ When the tuple number tr of the relation R(a,b) is selected, the expected value E[ta] of a tuple number ta of a relation R(a) is determined using the following approximation:

$$E[ta] \;\; = Da \quad \text{when } tr >> Da$$
$$\phantom{E[ta]\;\;} = tr \quad \text{when } tr << Da$$

The expected value E[tb] is determined in the same manner. It is assumed that the tuple number t of the relation R(a,b), the tuple number ta of the relation R(a), and the tuple number tb of the relation R(b) are given. A specific tuple t1 of the relation R(a,b) to be joined is considered, and the probability "Pa" of the value of this tuple t1 being included in the attribute "a" of the relation R(a,b) and the probability "Pb" of the value of this tuple t1 being included in the attribute "b" of the relation R(a,b) are indicated as follows.

$$Pa = ta/Da, \; Pb = tb/Db \tag{23}$$

When these equations are satisfied, the conditional probability "Pab" of the value of the tuple t1 being included in the attribute "ab" of the relation R(a,b) is:

$$Pab = t/(ta \times tb). \qquad (24)$$

The records of the attribute "ab" of the relation R(a,b) are selected from among "ta×tb" records. The following equation is derived from the above mentioned equations (23) and (24).

$$P = Pa \times Pb \times Pab = t/(Da \times Db) \qquad (25)$$

According to this equation (25), it is possible to determine the selectivity "p" of the relation R(a,b). The equation (25) is in accordance with the above equation (21), and the selectivity of the relation R(a,b) determined by using the equation (25) is reasonable.

The above mentioned equations can be extended in order to determine the selectivity in the case of a multi-attribute relation having three or more attributes.

According to the present invention, several relations having multiple attributes can be processed so as to reduce the quantity of data to be transmitted, such that the total transmittion time is minimized. Also, a high-level relation is transformed into low-level relations, and each of the low-level relations is processed so as to reduce the quantity of data to be transmitted.

According to the present invention, it is necessary to check the degree numbers as well as the selectivities for achieving an optimized sequence of query processes, and this may increase the load on the communication network. However, it is a minor problem in an actual distributed database system because the quantity of additional data due to the degree numbers and the selectivities being checked is relatively small.

As described in the foregoing, according to the present invention, it is possible to efficiently perform the query processes associated with the distributed databases when a query including multi-attribute relations joined together with respect to the multiple attributes thereof is input. The efficiency of the distributed database system is increased due to the use of the degree numbers of the relations. According to the present invention, it is possible to remarkably reduce the data transfer cost or the total transmission time.

Further, the present invention is not limited to the above described embodiment, and variations and modifications may be made without departing from the scope of the present invention.

What is claimed is:

1. A distributed database system for a communication network having a plurality of nodes, each of which nodes includes a distributed database, said distributed database system comprising:

local process means for extracting relations from each database of said communication network by performing local processes at each of said nodes of said communication system when a query including multi-attribute relations is input from one of said nodes;

degree setting means for setting a degree number of each of said extracted relations from said local process means based on (A) tuple numbers of single-attribute relations derived from said multi-attribute relations and (B) a tuple number of each of said multi-attribute relations;

relation set means for arranging a plurality of relation sets, each of which relation sets contains relations having the same degree number in ascending order by grouping said extracted relations from said local process means according to the degree number set by said degree setting means, wherein said relation sets include a first relation set containing relations with the lowest degree number;

extraction means for extracting single-attribute relations from each of said relation sets arranged by said relation set means so that said single-attribute relations are added to said first relation set;

semijoin operating means for repeatedly semijoining two relations of a relation set when a quantity of transfer data after said semijoining is detected to be smaller than a quantity of transfer data before said semijoining, and for adding derived relations resulting from said semijoining to a following relation set among the plurality of relation sets arranged by said relation set means; and control means or allowing said semijoin operating means to sequentially perform said semijoining and said adding for all of the plurality of relation sets arranged by said relation set means, starting from said first relation set and ending at a relation set having the highest degree number, so that each derived relation resulting from said semijoining is added to the transfer data.

2. A distributed database system according to claim 1, further comprising:

first means for detecting whether or not a derived relation, resulting from said semijoining by said semijoin operating means, is a high-level relation; and second means for dividing said derived relation into low-level relations when said derived relation is detected to be a high-level relation.

3. A distributed data base system according to claim 2, wherein:

said semijoin operating means semijoins two relations from among said low-level relations from said second means when it is detected that the quantity of transfer data resulting from said semijoining of said two relations is decreased, so that each derived relation resulting from said semijoining is added to a next relation set among the plurality of relation sets arranged by said relation set means.

4. A distributed database system according to claim 1, wherein:

said semijoin operating means includes said degree setting means.

5. A distributed database system according to claim 1, wherein said semijoin operating means includes:

first means for detecting whether or not a derived relation resulting from said semijoining by said semijoin operating means is a high-level relation, the high-level relation having a degree number greater than half of the maximum number of attributes included in the multi-attribute relations of the query.

6. A distributed database system according to claim 1, wherein said semijoin operating means includes:

second means for dividing a derived relation resulting from said semijoining by said semijoin operating means into low-level relations, each of which low-level relations has a degree number smaller than half of the maximum number of attributes included in the multi-attribute relations of the query, when said derived relation is detected to be a high-level relation.

7. A distributed database system according to claim 1, wherein:

said control means obtains the transfer data by adding each derived relation to the transfer data, so that the transfer data is transmitted to said node.

8. A distributed database system according to claim 1, further comprising:

means for sorting relations, included in each relation set of the relation sets arranged by said relation set means, according to the size of each relation in ascending order.

9. A distributed database system according to claim 1, further comprising:

means for detecting whether or not the quantity of the transfer data, after said semijoining is performed by said semijoin operating means, is smaller than the quantity of the transfer data before said semijoining is performed.

10. A distributed database system according to claim 1, wherein:

said degree setting means sets a degree number of a multi-attribute relation to a value "m" in accordance with the following equations and inequalities:

$$K1 = min[t1, t2, \ldots, tn]$$

$$K2 = min[t1 \times t2, t1 \times t3, \ldots, t_{n-1} \times t_n]$$

$$Kn = t1 \times t2 \times \ldots \times tn$$

$$K1 \leq K2 \leq \ldots \leq Km \leq T < Km+1 \leq \ldots \leq Kn$$

wherein:

T is a tuple number of said multi-attribute relation, ti (i=1,2,...,n) are tuple numbers of single-attribute relations derived from said multi-attribute relation, and Ki are integers derived from the tuple numbers of the single-attribute relations.

* * * * *